Nov. 29, 1927. 1,651,153
H. P. REILLY
MOTOR SUSPENSION FOR ELECTRICALLY DRIVEN VEHICLES
Filed April 17, 1926   2 Sheets-Sheet 2
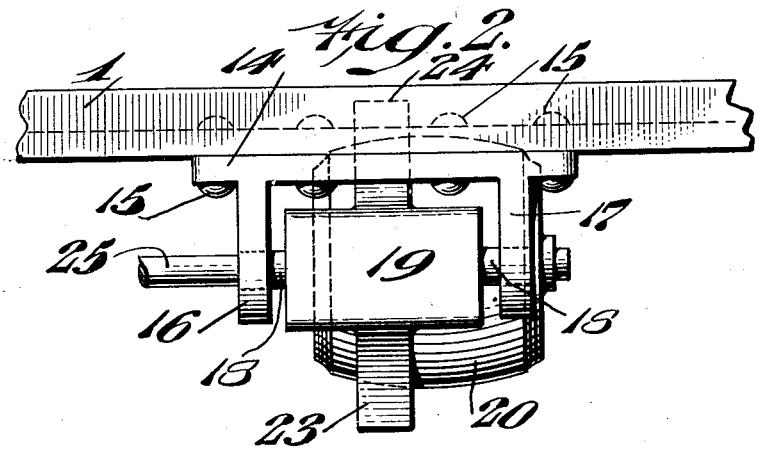
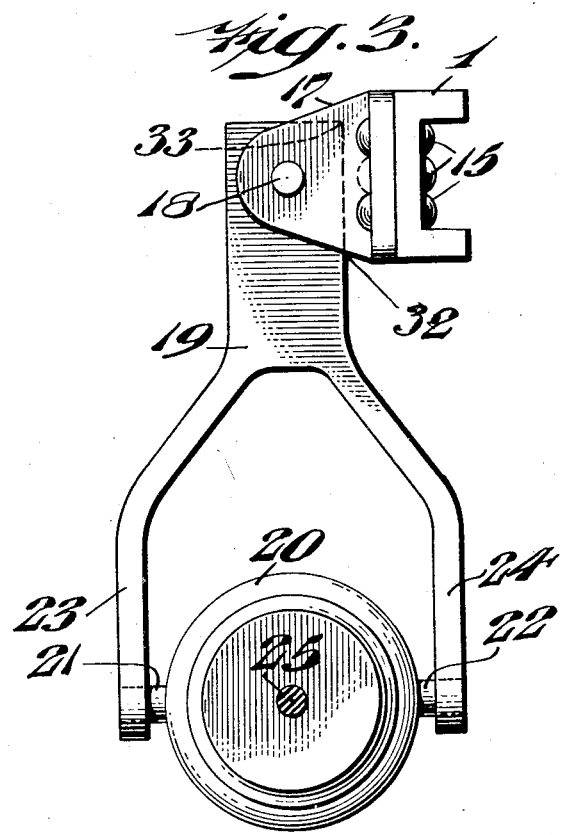
INVENTOR:
Hugh P. Reilly,
BY
ATTORNEYS.

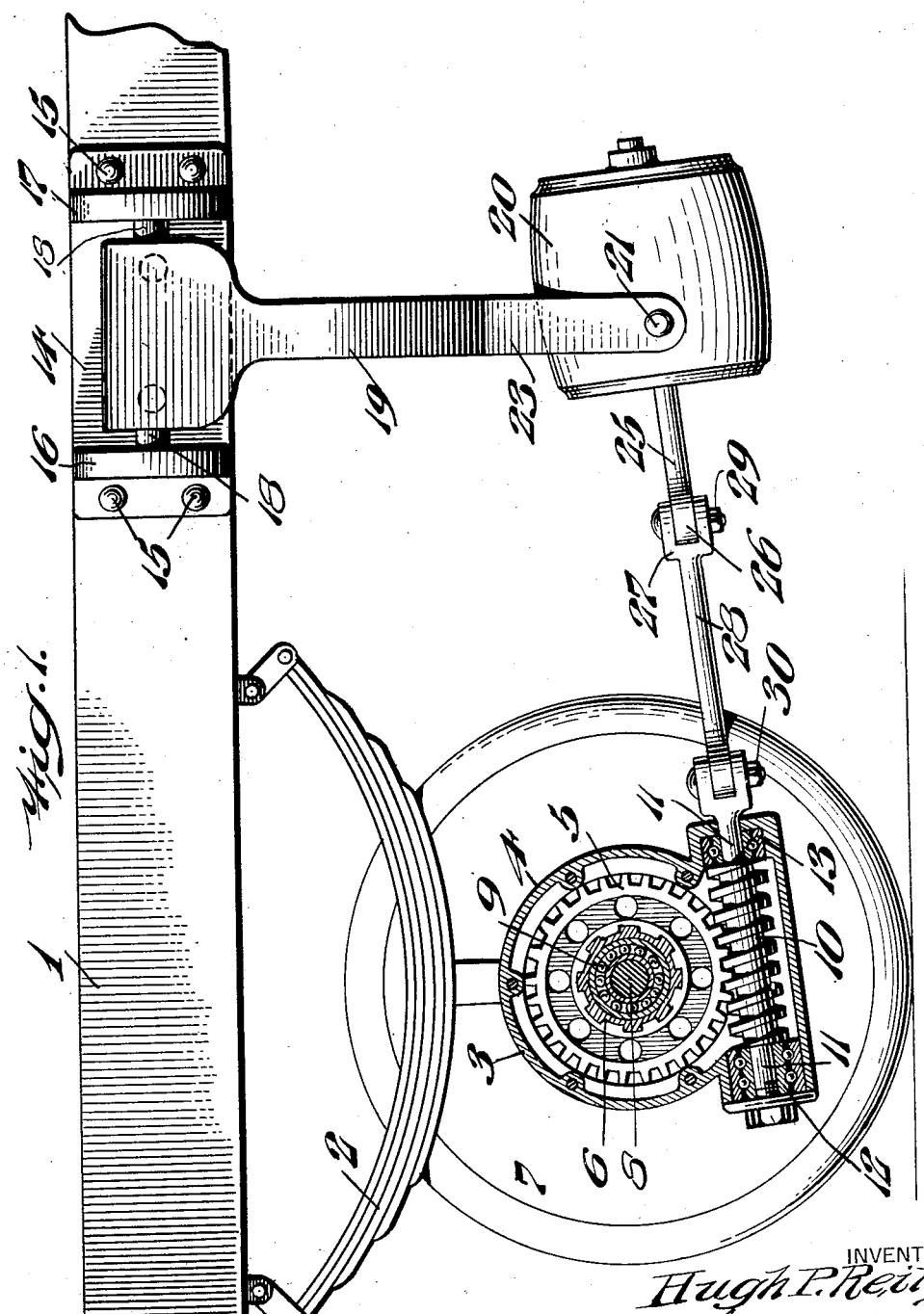

Patented Nov. 29, 1927.

1,651,153

UNITED STATES PATENT OFFICE.

HUGH P. REILLY, OF PHILADELPHIA, PENNSYLVANIA, ASSIGNOR TO THE ELECTRIC GENERATOR CORPORATION, OF PITTSBURGH, PENNSYLVANIA, A CORPORATION OF DELAWARE.

MOTOR SUSPENSION FOR ELECTRICALLY-DRIVEN VEHICLES.

Application filed April 17, 1926. Serial No. 102,715.

My invention relates to a new and useful construction in motor suspensions for electrically driven vehicles, and it relates more particularly to suspensions for the electric motors in such vehicles, whether a single or a pair of such motors be utilized, whereby, all strain on the motor and connection, due to the movements of the axle or wheel, is eliminated.

It is essential for the smooth and economical operation of electric vehicles to have the unsprung weight as light as possible. Particularly is this true in the case of electric vehicles, on account of the fact that, whether the electric motor is carried by the rear axle or the transmission gears are carried thereby, the weight of either the motor or the gears is thus carried directly upon the tires, without the intermediate cushioning action of any spring, thereby increasing the wear and tear on the tires as well as the mechanical parts, thus necessitating a heavier construction than would be necessary, if only part of the transmission gear was rigidly connected with the axle structure.

By my novel construction, the unsprung weight is reduced to a minimum by suspending the motor from the chassis and connecting the motor to the gear in such a way as to permit the free movement of the axle, thereby permitting a lighter construction throughout.

With the above ends in view, my invention consists of double suspension including two pivotal connections at right angles to each other, between the chassis and the motor, a worm gear carried by the wheel or axle of the vehicle, a worm carried by suitable casing in mesh with said worm gear and a suitable yieldable connection between the shaft of the motor and said worm.

For the purpose of illustrating my invention, I have shown in the accompanying drawings, a form thereof which is at present preferred by me, since it will give in practice satisfactory and reliable results, although it is to be understood that the various instrumentalities of which my invention consists can be variously arranged and organized, and that my invention is not limited to the precise arrangement and organization of these instrumentalities as herein shown and described.

Referring to the drawings:—

Figure 1 represents a side elevation of a motor suspension, with the gear casing shown in section.

Figure 2 represents a top plan view of the motor suspension.

Figure 3 represents an end elevation of the same.

Referring to the drawings, in which like reference characters indicate like parts, 1 designates one of the longitudinal channel frame members of the chassis of an electrically driven vehicle, having mounted thereon a semielliptical spring 2 of any usual construction, which in turn rests upon the rear axle housing 3, of which, the gear casing 4 forms a part. Within the gear casing 4 is disposed the worm gear 5, which is secured to the hub 6 of one of the traction wheels 7, said hub being mounted freely upon the axle 8 by means of the ball bearings 9. The gear casing 4 also supports the worm 10 in mesh with the worm gear 5, which worm 10 is carried by the shaft 11, which is rotatably supported by the ball bearings 12 and 13 within said gear casing 4, in a manner shown in Figure 1.

To the inner surface of the longitudinal channeled frame member 1, I secure a bracket 14 by means of the rivets or other fastening means 15, said bracket having the two laterally projecting lugs 16 and 17, within which is journalled the horizontal pivot pin or pins 18, which carry a pendant suspension yoke 19, the lower forked portion or arms of which straddle the electric motor 20, which may be of any suitable construction. The housing of the motor 20 is provided with a pair of horizontally aligned transverse trunnions 21 and 22, as shown particularly in Figure 3, which are journalled upon the arms 23 and 24, respectively, of the yoke 19.

The driving shaft 25, of the electric motor, has its end 26, pivotally mounted within the knuckle 27 of the shaft 28 by means of the bolt 29 extending therethrough. The opposed end of the connecting shaft 28, is, in turn, similarly connected to the worm shaft 11 through the pivotal connection 30, thereby forming an articulated compensating connection common to the motor and driving mechanism for the traction wheel.

It is obvious that by this novel construction, any relative motion of the worm gear and the electric motor is easily compensated for, and while the motor is connected rigidly to the chassis, it can easily and accurately follow all the movements of the wheel or gear. Thus, while the pivotal support upon the trunnions 21 and 22 permits the motor 20 to oscillate in a vertical plane, so as to follow the movements of the rear axle or wheel and gear, the pivotal suspension about the pivot pin or pins 18 allows for the side swaying of the chassis.

Another aim of my novel construction is the perfect accessibility of all parts, for ease in dismantling for inspection and repairs. It is also understood that instead of using worm gears, any other kind of gear or double gear for the reduction of the traction wheel speed can be used. I may moreover, provide, instead of the two pivotal connections at the two opposed ends of the connecting shaft 28, a common connecting telescoping sleeve to receive the ends of the worm shaft 11 and the motor shaft 25 respectively, which shafts may be suitably keyed within said sleeve so as to permit the necessary variation in the length of the connection between the motor shaft and the worm shaft.

The transverse swinging movement of the pendant yoke is confined within suitable limits by the engagement of the edge 32 and the upper corner 33 of the yoke 19, by the bracket 14, which thereby also acts as a limiting stop for the said yoke 19 in either direction.

It will now be apparent that I have devised a novel and useful construction in motor suspension for electrically driven vehicles, which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new, and desire to secure by Letters Patent is:—

1. In an electrically driven vehicle, a frame, a bracket secured thereto and having a pair of outwardly projecting lugs, a pivot journalled in said lugs, a pendant yoke carried by said pivot, an electric motor pivotally supported within said yoke, an axle housing, a traction wheel at the end thereof, a worm gear within said housing operatively connected to said wheel, a worm within said housing and in mesh with said worm gear, a worm shaft, and an articulated connection directly connecting said worm shaft and the motor shaft, said motor being free to oscillate with respect to said axle housing and having no rigid connection therewith.

2. In an electrically driven vehicle, a frame, a bracket secured thereto and having a pair of outwardly projecting lugs, a pivot journalled in said lugs, a pendant yoke carried by said pivot adapted to swing transversely of said frame, an electric motor pivotally supported within said yoke and adapted to oscillate longitudinally of said frame, an axle housing, a traction wheel carried at one end of said housing, a worm gear within said housing and operatively connected to said wheel, a worm in mesh with said worm gear, a worm shaft, and an articulated connection directly connecting said worm shaft and the motor shaft; said motor being free to oscillate with respect to said housing and having no rigid connection therewith.

HUGH P. REILLY.